3,559,415
EARTH CUTTING APPARATUS
Donald R. Vaughan and Carl J. Falcon, Woodland, Calif., assignors, by mesne assignments, to Donald R. Vaughan, Woodland, Calif.
Filed Nov. 3, 1967, Ser. No. 680,487
Int. Cl. F16l *1/00;* A01b *33/06*
U.S. Cl. 61—72.6
13 Claims

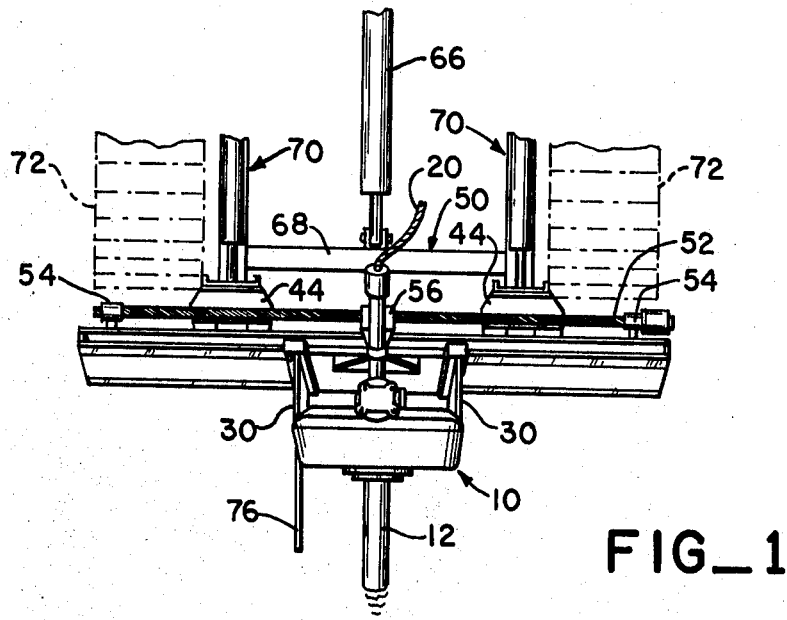
FIG_1
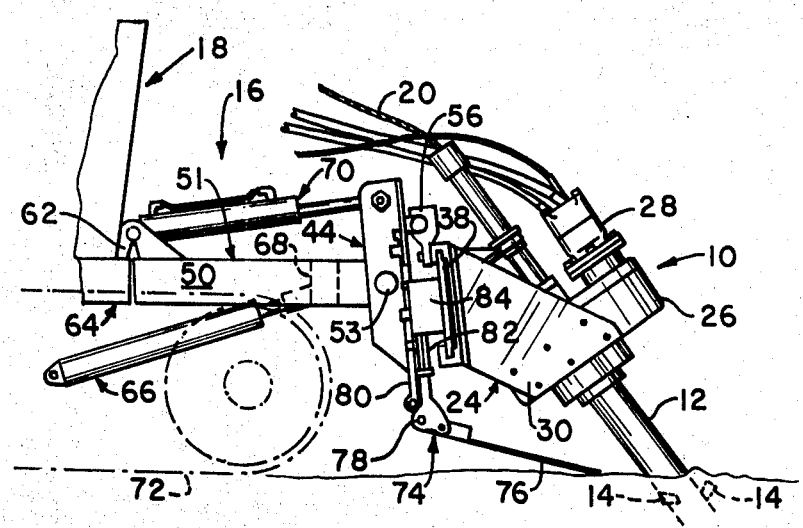
FIG_2

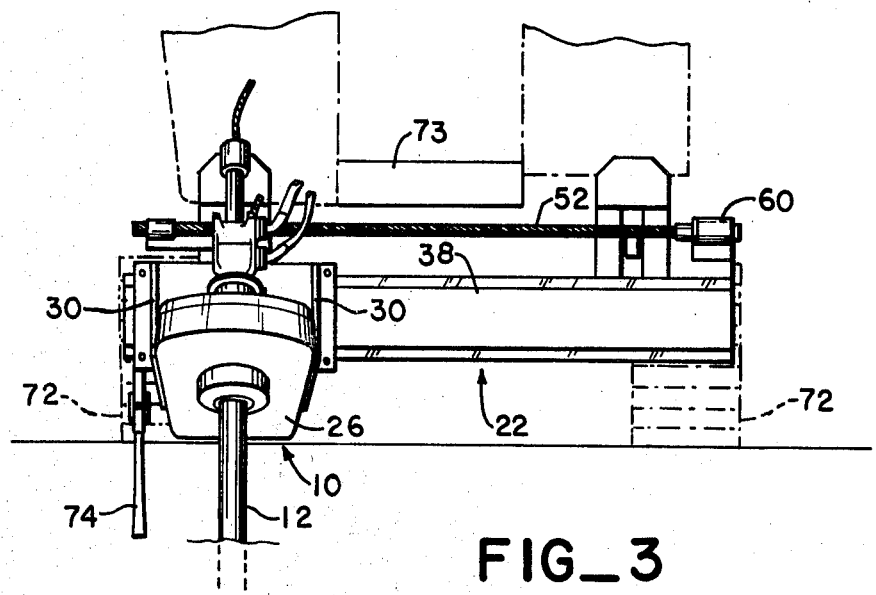
FIG_3
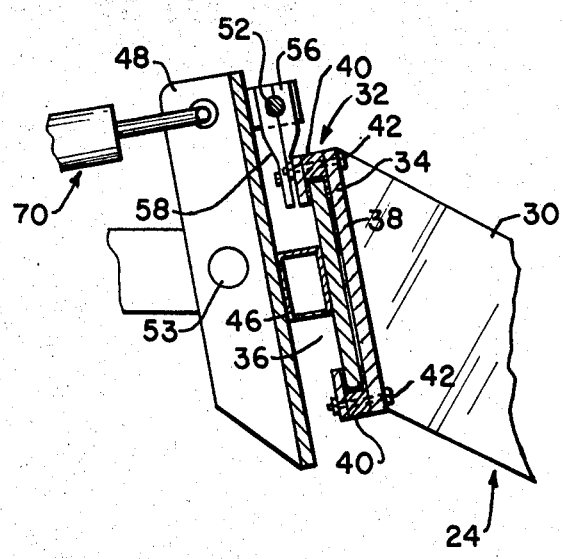
FIG_4

# United States Patent Office 3,559,415
Patented Feb. 2, 1971

ABSTRACT OF THE DISCLOSURE

Earth cutting apparatus having a cutter tool comprised of a rotatable shaft provided with a number of spaced cutter bits secured to and extending laterally from the shaft. A support mounts the shaft for axial rotation and is shiftably mounted on a guide bar attached to a forwardly moving vehicle. The guide bar extends transversely of the forward direction of travel of the vehicle and has means to move the support longitudinally of the guide bar in either direction to selectively position the cutter tool along a path transverse to said forward direction of travel. A depth control is provided to assure that the cutter tool will be maintained at a predetermined depth below ground level.

---

This invention relates to improvements in earth cutters of the type having a rotatable shaft provided with spaced cutter bits thereon and, more particularly, to improved earth cutting apparatus which can move from side to side as it moves in a generally forward direction.

The present invention is directed to earth cutting apparatus of the type described wherein the cutter tool, comprised of the shaft and cutter bits, is selectively moved into and through the earth to sever the same along a desired path. The essence of the invention is the provision of means for shifting the cutter tool from side to side as it moves forwardly. This feature allows the path of the cutter tool to be varied as desired and even permits movement of the cutter tool when it is not moving forwardly.

While the teachings of the present invention can be utilized in a number of different ways, it is especially adapted for use with cable laying equipment of the type disclosed in copending patent application, Ser. No. 453,-677, filed May 6, 1965, entitled Cable Layer, now U.S. 3,354,660. The structure of this disclosure includes a rotatable tubular cutter tool adapted to be moved forwardly and transversely through the earth to provide for the non-trenching laying of cable below the surface of the earth as the shaft moves forwardly under the influence of a vehicle. The cable is fed through the cutter tool and is directed outwardly from its lower end and thereby laid below ground level. The depth of the cut made into the earth will determine the depth at which the cable is laid.

It is oftentimes desirable or necessary for the cable to extend along a desired path which deviates more or less from the forward direction of movement of the vehicle of the cable layer. Since the cutter tool generally is held against any movement relative to the vehicle during earth cutting operations, it has heretofore been impossible to cause any path change without some maneuvering of the vehicle. This usually requires that the vehicle be moved in reverse and forwardly a number of times in order to assure that the cable is properly laid along the desired path.

Another problem which arises in the use of the cable layer occurs when a cable is to be laid close to and along one side of a building structure, such as a house or wall. Normally, the cutter tool is positioned centrally of the rear end of the vehicle so that the cutter tool and thereby its path of travel will necessarily be spaced outwardly a fixed minimum distance from the building. The cable can, therefore, be laid no closer to the building than this fixed minimum distance; thus, the cable layer is limited in accomplishing its intended purpose.

The present invention overcomes the problems associated with cable layers of the type described by providing a means whereby the cutter tool can shift from side to side either as it moves with a vehicle in a forward direction or during the time when the vehicle is stopped. This permits the cutter tool to lay a cable along a path which is angularly disposed with respect to the forward direction of travel of the vehicle. It also allows the cutter tool to lay a cable adjacent to and along a path closely adjacent to the side of a building notwithstanding the fact that the vehicle has width and must move along the building.

The present invention also provides for maintaining the cutter tool at a constant depth below the surface of the earth so that, regardless of the irregularities in the contour of the earth, a cable can be laid a a predetermined depth below the ground. In this way, the cutter tool will be caused to raise and lower in response to contour irregularities and such constant depth characteristics can be achieved even though the shaft is selectively moved from side to side during the forward progress of the vehicle on which the shaft is mounted.

The primary object of this invention is, therefore, to provide earth cutting apparatus of the type having a rotatable cutter tool movable forwardly through the earth and which can be shifted from side to side with respect to its normally, forward path of travel, whereby the direction of the cut in the earth can be changed without having to resort to time-consuming maneuvers or other measures to effect direction changes.

Another object of this invention is to provide cutting apparatus of the type described wherein the cutter tool is attached to a forwardly moving vehicle and movable longitudinally of a guide bar secured to and extending transversely of the forward direction of travel of the vehicle, whereby the cutter tool can cut the earth along a line which deviates from the forward direction of travel regardless of whether or not the vehicle is moving forwardly.

Yet another object of this invention is to provide improvements in non-trenching cable layers of the type having a rotatable, tubular cutter tool movable transversely through the earth in a forward direction wherein the tool can be selectively moved from side to side as it moves forwardly and as cable is laid thereby whereby the cable can be laid below ground level along a path which deviates from the forward direction of travel of the cutter tool.

A further object of this invention is to provide improvements in earth cutting tools of the aforesaid character wherein means is provided to shift the cutter tool up or down in response to contour changes of the surface of the earth, whereby the cutter tool will be maintained at a predetermined depth below the ground.

Other objects of this invention will become apparent as the following specification progresses, reference being had to the accompanying drawings for an illustration of a preferred embodiment of the invention.

In the drawings:

FIG. 1 is a top plan view of the rear portion of a cable layer of the type having a rotatable cutter tool on a forwardly moving vehicle;

FIG. 2 is a side elevational view of the cable layer;

FIG. 3 is a rear elevational view thereof; and

FIG. 4 is an enlarged, cross-sectional view of a portion of the cable layer showing the side shifting structure in greater detail.

Earth cutting apparatus broadly denoted by the numeral 10 is of the type having a rotatable cutting tool comprised of a rotatable shaft 12 having a plurality of cutter bits 14 (FIG. 2) secured to the outer surface thereof and projecting laterally therefrom. While the teachings of the present invention will be applicable to a number of different applications, it will hereinafter be described with respect to a mobile cable layer 16 of which cutting apparatus 10 forms a part. To this end, cutting apparatus 10 is secured to the rear end of a forwardly moving vehicle 18 and disposed for movement through the earth as the shaft is rotated and the cutter bits cut through the earth without forming a trench. Shaft 12 is tubular and a cable 20 (FIG. 2) is fed into and through the open, upper end of shaft 12. The cable extends outwardly from the open, bottom end of the shaft and is progressively laid at a predetermined depth below the surface of the earth as shaft 12 rotates and moves in a forward direction under the influence of vehicle 18. Means is provided to raise and lower the cutter tool on the vehicle as will be hereinafter described.

The essence of the present invention is the provision of transverse guide means 22 for mounting cutting apparatus 10 for transverse movement relative to its forward direction of travel. Guide means 22 thus allows the cutter tool to shift laterally to permit deviations in the cutting line of the cutter tool relative to the normally forward direction of travel of the cutter tool. Thus, a cable can be laid along an angularly disposed path relative to the forward direction movement of the vehicle. This feature also allows cutting apparatus 10 to move in close proximity to and along a building, wall or other structure which prohibits the vehicle from getting any closer to the building than a fixed minimum distance. In this way, cable layer 16 becomes more versatile and the cutter tool is not limited to a fixed position on the vehicle as has heretofore been available with earth cutters of this type.

Cutting apparatus 10 further includes a support 24 which mounts the base 26 into which the upper end of shaft 12 extends. Base 26 houses the gears and other structure, which, when used in combination with a hydraulic motor 28 secured to the base, causes shaft 12 to rotate relative to support 24 in a predetermined direction. Thus, the cutter bits 14 on the shaft will cut through the earth as shaft 12 moves transversely therethrough.

Support 24 includes a pair of spaced brackets 20 which are generally parallel and are rigidly secured to the opposed sides of base 26. Brackets 30 extend outwardly from base 26 and are rigidly secured to a sliding member 32 broadly denoted by the numeral 32 and coupled to guide means 22 for movement longitudinally thereof in either of a pair of opposed directions.

Sliding member 32 includes one front support member 34 (FIG. 4) which is interconnected at its top and bottom margins with backing strips 36. Spacer bars 40 are disposed between member 34 and strips 36, and through bolt means 42 holds these components in a manner to form a recess therebetween for receiving guide bar 38, the latter forming a part of guide means 22.

A pair of mounting frames 44 are secured by brackets 46 (FIG. 4) to a proximal face of guide bar 38. Each frame 44 includes a pair of spaced channel members 48 which are rigidly secured together and are disposed on opposed sides of a rearwardly extending beam 50 (FIGS. 2 and 4) forming a part of a subframe 51 at the rear of vehicle 18. Frames 44 are pivotally mounted on respective beams 50 by pins 53 to permit frames 44 and thereby guide bar 38 to rotate about a generally horizontal axis. Thus, guide bar 38 and frames 44 and 51 provide means for mounting cutting apparatus 10 on vehicle 18 for movement transversely of the forward path of travel of the vehicle.

A rotatable screw 52 is coupled with sliding member 32 to shift the same longitudinally of guide bar 38 in opposite directions. To this end, screw 52 is journalled at its ends by bearings 54 which are rigidly secured to the adjacent ends of guide bar 38 in any suitable manner. Screw 52 also is threadably coupled to a nut 56 carried by an extension 58 (FIG. 4), the latter being rigidly secured in any suitable manner to sliding member 32. Thus, as screw 52 is rotated in one sense, sliding member 32 and thereby cutting apparatus 10 is moved in one direction along guide bar 38. Conversely, as the screw is rotated in the opposite sense, cutting apparatus 10 is moved toward the opposite end of the guide bar. A reversible motor 60 is operably coupled to one end of screw 52 for rotating the same in opposed directions.

Frame 51 is pivotally mounted by means of a hinge 62 (FIG. 2) on the rear end of the main frame 64 of vehicle 18 for rotation about a generally horizontal axis. Frame 51 can thereby be moved up and down and, since frames 44 are pivotally secured to the outer ends of beams 50, frames 44 as well as shaft 12 can also be moved up and down relative to frame 51. A piston and cylinder assembly 66 pivotally secured at one end to main frame 64 at any suitable location thereon is also pivotally secured at its opposite end to a crossbeam 68 spanning the distance between beams 50 (FIG. 2). Assembly 66, when actuated, effects the up and down movement of frame 51.

A piston and cylinder assembly 70 is provided for each frame 44, respectively. Each assembly 70 is pivotally secured in any suitable manner to the hinge pin of hinge 62 and extends rearwardly therefrom. The rearmost extremity of each assembly 70 is pin-mounted to the upper end of the respective frame 44 as shown in FIGS. 2 and 4. Thus, frames 44 can be rotated about pins 53 relative to frame.

Vehicle 18 may be of any desired construction and, for purposes of illustration, it is of the type having a pair of spaced, ground-engaging tracks 72 which are adapted to be coupled to a drive motor (not shown) for propelling the vehicle forwardly. An operator seat or platform 73 is provided for the vehicle and suitable controls (not shown) adjacent to the operator location control motors 28 and 60 and piston and cylinder assemblies 66 and 70. Preferably, motors 28 and 60 are hydraulic motors so that a fluid under pressure will be used to operate all of the power devices of cable layer 16.

Cable layer 16 is also provided with means for maintaining shaft 12 at a predetermined depth below ground level as cutting apparatus 10 moves forwardly and as the shaft rotates and cuts through the earth. To this end, the control for maintaining this fixed depth is broadly denoted by the numeral 74 (FIG. 2) and includes a ground engaging member 76 pivotally mounted by means of a pin 78 on an extension 80 projecting downwardly from and secured in any suitable manner to one end of guide bar 38. Member 76 is operably coupled by a linkage 82 to a fluid actuated control valve 84 also secured to guide bar 38. Valve 84 is operably coupled to the fluid flow system of piston and cylinder assemblies 70 to control the fluid flow thereto, whereby the angular positions of frames 44 relative to frame 52 will be controlled by valve 84.

Member 76 engages the ground and senses the contour changes as cutting apparatus 10 moves forwardly. As the ground contour changes, valve 84 is actuated by virtue of the up or down movement of member 76 to, in turn, cause assemblies 70 to pivot frames 44 clockwise or counter-clockwise depending upon whether shaft 12 is to be moved up or down relative to frame 51. If, for instance, member 76 senses a depression in the earth, assembly 70 will be actuated in a manner to swing frames 44 in a clockwise sense so that shaft 12 will move downwardly. In this way, the lower end of the shaft will descend to thereby keep the distance between the lower end of the shaft and ground level at a relatively constant value. Conversely, if the member 76 senses a rise, frames 44 will be rotated in a counter-clockwise sense to elevate shaft 12 accordingly.

OPERATION

Cutting apparatus 10 is arranged on vehicle 18 in the manner shown in FIG. 2 with shaft 12 initially elevated and spaced above the ground. This can be accomplished by a combination of movements of frames 44 and 51 whereby frames 44 are pivoted in a counter-clockwise sense with respect to frame 51 to rotate support 24 and thereby shaft 12 upwardly. Also, frame 51 is rotated in a counter-clockwise sense relative to main frame 64 to elevate, not only frames 44 and guide bars 38, but also cutting apparatus 10. When this has been accomplished, the vehicle may move over the ground until it reaches the location at which cable is to be laid.

When cable is to be laid, shaft 12 is lowered into the ground after motor 28 has been energized. Thus, cutter bits 14 cut into the soil until shaft 12 is at the proper depth. Then, vehicle 18 is driven forwardly as shaft 12 continues to rotate and remains in its operative position by frames 44 and 51.

Member 76 will move over the ground and sense contour irregularities of the earth. As member 76 moves up and down due to changes in the contour of the surface of the earth, valve 84 will operate assemblies to cause shaft 12 to be moved up and down so that the lower end of the shaft, from which the cable passes out and into the earth, will remain at a constant depth below ground level.

The operator can monitor the cutting action of the shaft at all times. In this way, the shaft can be caused to move along a predetermined path different from the forward path of travel of the vehicle. To this end, motor 60 can be selectively energized to shift support 24 in a desired direction along guide bar 38 to thereby change the direction of travel of the shaft relative to the direction of travel of the vehicle. This side-shifting action of the shaft can occur as the vehicle continues to move forwardly so that the cable laying operation continues uninterruptedly and the cable can be laid along a path which progressively changes direction. Also, cutting apparatus 10 can move along guide bar 38 even though vehicle 18 is stopped.

Another important feature of the invention resides in the fact that support 24 can be positioned at either end of guide bar 38 as shown in FIG. 3 whereby the cable can be laid in proximity to and along a building, wall or other structure which would normally prohibit the vehicle from getting close enough to lay the cable directly adjacent to the building.

After a cable laying operation has been completed, the cutter tool can be elevated above the ground to permit the vehicle to be driven to another location. The cutter tool may be returned to the center of guide bar 38 for transit in its elevated condition.

While one embodiment of this invention has been shown and described, it will be apparent that other adaptations and modifications can be made without departing from the true spirit and scope of the invention.

What is claimed is:

1. Apparatus for cutting the earth comprising: a support; a shaft having a plurality of spaced cutter bits secured to and extending laterally from said shaft; means mounting said shaft on said support for axial rotation relative thereto, said support adapted to be moved in a forward direction with said shaft being disposed at least partially within the earth, whereby the cutter bits will cut the earth as the shaft is rotated; means carried by the support and coupled with said shaft for rotating the same relative to the support; a substantially straight guide bar, said support being shiftably mounted on the guide bar for movement longitudinally thereof along a substantially rectilinear path transversely of said forward direction; and means carried by the guide bar and coupled with said support for selectively moving the same along said path.

2. Cutting apparatus as set forth in claim 1, wherein said support is slidably mounted on said bar guide.

3. Earth cutting apparatus comprising: a vehicle movable forwardly over the ground; a rotatable cutter tool; a straight guide bar carried by the rear end of the vehicle transversely of the forward direction of travel, said cutter tool being mounted on said vehicle at a location permitting said cutter tool to be disposed at least partially in the ground and to move transversely therethrough; means coupled with said cutter tool for rotating the same, whereby the cutter tool will cut the earth as it moves transversely through the ground, said cutter tool being shiftably mounted on said guide structure and means guide bar; and means carried by the guide bar coupled with said cutter tool for selectively moving the same relative to and along the guide bar.

4. In cable laying apparatus of the type having a rotatable, tubular earth cutting tool secured to a ground engaging vehicle and movable therewith in a forward direction transversely through the earth as a cable is fed into and through the cutting tool, the improvement comprising: a rectilinear guide bar adapted to be secured to said vehicle transversely of said forward direction; means adapted to be coupled to said cutting tool for mounting the same on said guide bar for movement along the same; and means carried by the guide bar and coupled with said mounting means for selectively moving the same relative to and along said guide bar.

5. In apparatus as set forth in claim 4, wherein said moving means is operable independently of the forward movement of said vehicle.

6. Earth cutting apparatus comprising: a vehicle movable over the ground; a frame shiftably mounted on said vehicle for up and down movement relative thereto; an earth cutting tool; means mounting said cutting tool on said frame for rotation relative thereto; means coupled with said cutting tool for rotating the same relative to the frame, whereby the cutting tool will cut the earth as it extends into the ground and moves transversely therethrough under the influence of said vehicle; actuatable means coupled with said frame for moving the same up and down relative to the vehicle; and means responsive to the position of said frame relative to the ground for selectively actuating said moving means, whereby the cutting tool can be maintained at a predetermined depth in the ground.

7. Apparatus as set forth in claim 6, wherein said frame is pivotally mounted on said vehicle for rotation about a generally horizontal axis, said mounting means being secured to the frame at a location spaced from said axis.

8. Apparatus as set forth in claim 6 wherein said actuatable means includes a fluid actuated power unit, said actuating means including an operable fluid valve coupled to said power unit to control the fluid flow thereto and a shiftable, ground-engaging member coupled to the valve for operating the same as a function of the contour of the ground over which the vehicle moves.

9. Apparatus for cutting the earth comprising: a support; a shaft having a plurality of spaced cutter bits secured thereto and extending outwardly therefrom; means mounting said shaft on said support for axial rotation relative thereto, said support adapted to be moved in a forward direction with said shaft being disposed at least partially within the earth, whereby the cutter bits will cut the earth as the shaft is rotated; means coupled with said shaft for rotating the same relative to said support; means mounting the support for reciprocation along a path transversely of said forward direction; a rotatable screw threadably coupled with said support for moving the same along said path; and power actuated structure coupled with said screw for selectively rotating the latter in opposed directions.

10. Earth cutting apparatus comprising: a vehicle movable forwardly over the ground and having a frame pivotally mounted thereon for rotation about a generally horizontal axis, a rotatable cutter tool; a guide bar disposed transversely of the forward direction of travel of the vehicle and being pivotally mounted on the frame for rotation about a second horizontal axis, said cutter tool being shiftably mounted on said guide bar, the latter being disposed to permit the cutter tool to extend at least partially into the ground and to move transversely therethrough; means coupled with the cutter tool for rotating the same, whereby the cutter tool will cut the earth as it moves transversely through the ground; means coupled with said cutter tool for selectively moving the same transversely of said forward direction; first power means carried by said vehicle for selectively pivoting said frame relative thereto; and second power means coupled with said guide bar for selectively pivoting the latter relative to said frame.

11. Earth cutting apparatus comprising: a vehicle movable forwardly over the ground; a rotatable cutter tool; a frame mounted on said vehicle for up and down movement; and actuatable power assembly coupled to the frame for raising and lowering the same relative to the ground; a structure carried by said frame and disposed transversely of the forward direction of movement of the vehicle, said cutter tool being carried by said structure for movement therealong, said structure being disposed to permit said cutter tool to extend at least partially into the ground and to move transversely therethrough; means coupled with said cutter tool for rotating the same, whereby the cutter tool will cut the earth as it moves transversely through the ground; means coupled with said cutter tool for selectively moving the same transversely of said forward direction; and means coupled with said assembly and responsive to the location of the frame relative to the ground for actuating said assembly to maintain the frame at a predetermined location relative to the ground, whereby the cutter tool will be maintained at a fixed depth below ground level.

12. Earth cutting apparatus comprising: a vehicle movable forwardly over the ground; a rotatable cutter tool; means mounting said cutter tool on said vehicle at a location permitting said cutter tool to be disposed at least partially in the ground and to move transversely therethrough; means coupled with said cutter tool for rotating the same, whereby the cutter tool will cut the earth as it moves transversely through the ground, said mounting means including a frame mounted on said vehicle for up and down movement, elongated guide structure secured to the frame and extending transversely of the forward path of the vehicle, said cutter tool being shiftably mounted on said guide structure, thereby the cutter tool is movable with said frame; means coupled with the frame for selectively moving the same up and down; and means coupled with said cutter tool for selectively moving the same relative to the guide structure and transversely of said forward path of travel.

13. Earth cutting apparatus comprising: a vehicle movable forwardly over the ground; a rotatable cutter tool; means mounting said cutter tool on said vehicle at a location permitting said cutter tool to be disposed at least partially in the ground and to move transversely therethrough; means coupled with said cutter tool for rotating the same, whereby the cutter tool will cut the earth as it moves transversely through the ground, said mounting means including a frame; an elongated guide bar pivotally mounted on said frame for rotation about a substantially horizontal axis and extending transversely of the forward path of the vehicle, said cutter tool being shiftably mounted on said guide bar; means coupled with said guide bar for rotating the same relative to the frame; and means coupled with said cutter tool for selectively moving the same relative to the guide strucuture and transversely of said forward path of travel.

References Cited

UNITED STATES PATENTS

| | | | |
|---|---|---|---|
| 2,406,546 | 8/1946 | Kinney et al. | 173—43X |
| 2,732,197 | 1/1956 | Cornett | 173—43X |
| 2,856,155 | 10/1958 | Putt | 173—43 |
| 1,337,184 | 4/1920 | Adams | 61—72.6 |
| 3,024,851 | 3/1962 | Harres | 61—72.5X |
| 3,354,660 | 11/1967 | Vaughan | 37—81X |
| 3,403,521 | 10/1968 | Kant | 61—72.6 |

FOREIGN PATENTS

| | | | |
|---|---|---|---|
| 838,132 | 9/1952 | Germany | 61—72.6 |

JACOB SHAPIRO, Primary Examiner

U.S. Cl. X.R.

37—81; 172—522, 741; 173—43